(12) United States Patent
Beier et al.

(10) Patent No.: US 9,957,838 B2
(45) Date of Patent: May 1, 2018

(54) TANK DEVICE OF AN AERO ENGINE WITH AN APPLIANCE FOR INTRODUCING OIL

(71) Applicant: Rolls-Royce Deutschland Ltd & Co KG, Blankenfelde-Mahlow (DE)

(72) Inventors: Juergen Beier, Schulzendorf (DE); Gideon Venter, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 266 days.

(21) Appl. No.: 14/847,553

(22) Filed: Sep. 8, 2015

(65) Prior Publication Data

US 2016/0076399 A1    Mar. 17, 2016

(30) Foreign Application Priority Data

Sep. 11, 2014   (DE) .......................... 10 2014 113 128

(51) Int. Cl.
  *F01D 25/18*    (2006.01)
  *F16N 19/00*    (2006.01)
  (Continued)

(52) U.S. Cl.
  CPC ............. *F01D 25/18* (2013.01); *F01D 25/12* (2013.01); *F01D 25/20* (2013.01); *F02C 7/06* (2013.01);
  (Continued)

(58) Field of Classification Search
  CPC .......... F01D 25/18; F01D 25/12; F01D 25/20; F02C 7/06; F02C 7/32; F16N 19/00
  See application file for complete search history.

(56) References Cited

U.S. PATENT DOCUMENTS 3,722,624 A * 3/1973 Buckland .............. F01D 25/183
                                                184/6.11
4,217,120 A * 8/1980 Reynolds ............... B64D 33/00
                                                55/385.1
(Continued)

FOREIGN PATENT DOCUMENTS

DE          20103652 U1    7/2002
DE    102009056518 A1    6/2011
(Continued)

OTHER PUBLICATIONS

German Search Report dated Jun. 16, 2015 for related German Application No. 10 2014 113 128.2.
(Continued)

*Primary Examiner* — Michael A Riegelman
(74) *Attorney, Agent, or Firm* — Shuttleworth & Ingersoll, PLC; Timothy Klima

(57) ABSTRACT

A tank device of an aero engine, which has an inlet appliance for the supply of an air-oil volume flow into a tank space of the tank device, a separation appliance for the separation of oil from the air-oil volume flow that is supplied to the tank space, a conduit area which is confined by at least one wall and in which an air-oil volume flow can be guided in the area of the tank space at least in certain areas, and an outlet appliance, in the area of which a volume flow can be discharged via a valve appliance from the tank space of the tank device. At least one appliance for introducing oil is provided, by means of which oil can be supplied into the area of the conduit area substantially against a flow direction of the air-oil volume flow which is forming during operation in the conduit area.

20 Claims, 4 Drawing Sheets

(51) Int. Cl.
  *F01D 25/12* (2006.01)
  *F02C 7/32* (2006.01)
  *F02C 7/06* (2006.01)
  *F01D 25/20* (2006.01)
  *F01M 13/04* (2006.01)

(52) U.S. Cl.
  CPC ............. *F02C 7/32* (2013.01); *F16N 19/00* (2013.01); *F01M 2013/0427* (2013.01); *F05D 2260/20* (2013.01); *F05D 2260/609* (2013.01); *F05D 2260/98* (2013.01)

(56) References Cited

U.S. PATENT DOCUMENTS

| | | | | |
|---|---|---|---|---|
| 5,028,318 | A * | 7/1991 | Aslin | B01D 21/02 209/725 |
| 5,587,068 | A * | 12/1996 | Aho, Jr. | B01D 19/0057 184/6 |
| 6,463,819 | B1 * | 10/2002 | Rago | B64D 37/22 137/112 |
| 8,201,664 | B2 * | 6/2012 | Brouillet | F01D 25/20 184/6.24 |
| 9,021,183 | B2 | 5/2015 | Etter et al. | |
| 2003/0233942 | A1 * | 12/2003 | Konishi | F15B 1/26 96/208 |
| 2009/0120296 | A1 * | 5/2009 | Saito | B01D 19/0057 96/174 |
| 2011/0314830 | A1 | 12/2011 | Legare | |
| 2015/0135660 | A1 | 5/2015 | Beier et al. | |
| 2015/0135663 | A1 | 5/2015 | Beier et al. | |
| 2015/0321130 | A1 * | 11/2015 | Beier | B01D 45/12 96/306 |
| 2017/0145858 | A1 * | 5/2017 | Blumrich | F01D 25/18 |

FOREIGN PATENT DOCUMENTS

| | | |
|---|---|---|
| DE | 102011016501 A1 | 10/2012 |
| DE | 102013112771 A1 | 5/2015 |
| DE | 102013112773 A1 | 5/2015 |
| EP | 2666982 A2 | 11/2013 |

OTHER PUBLICATIONS

European Search Report dated Jan. 26, 2016 for counterpart European application No. 15183180.7.

* cited by examiner

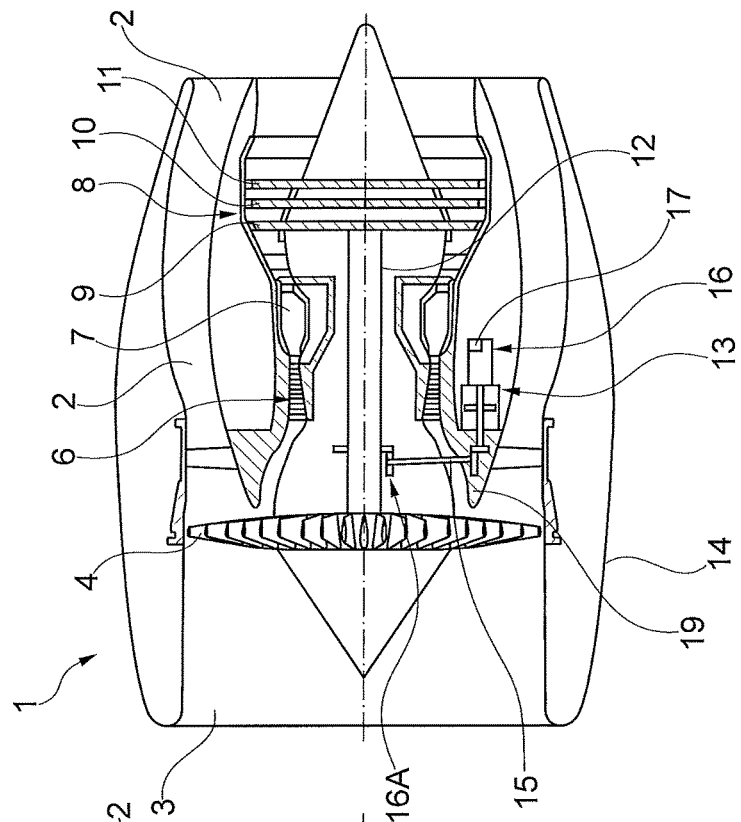
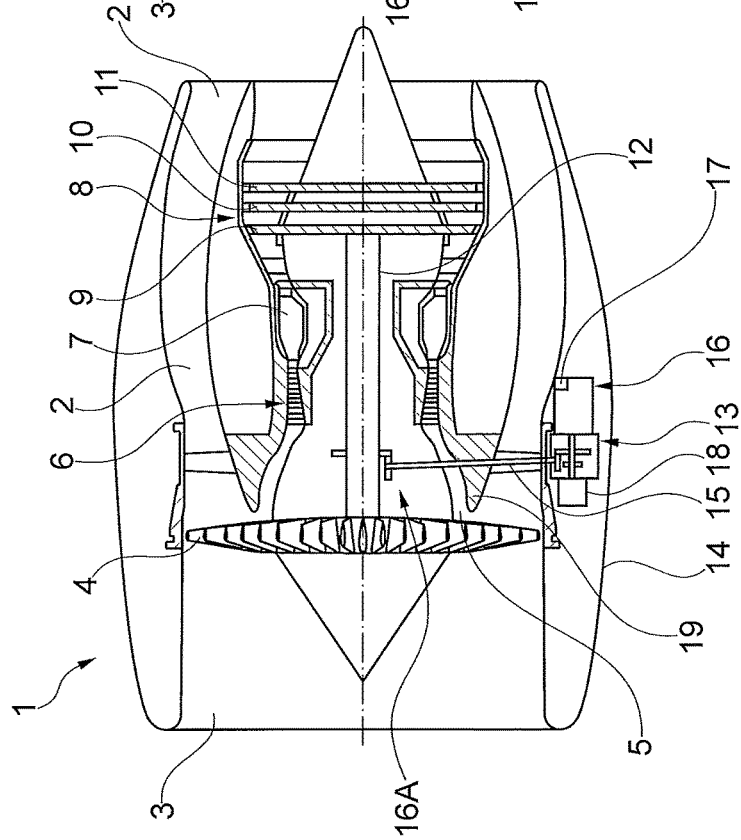
Fig. 1a
Fig. 1b

TANK DEVICE OF AN AERO ENGINE WITH AN APPLIANCE FOR INTRODUCING OIL

This application claims priority to German Patent Application 102014113128.2 filed Sep. 11, 2014, the entirety of which is incorporated by reference herein.

The invention relates to a tank device of an aero engine with an inlet appliance, a separation appliance, a conduit area and an outlet appliance according to the generic term as disclosed herein.

In jet engines as they are known from practice, exhaust air containing oil is supplied to an oil tank during operation in order to separate the oil from the supplied air-oil mixture. For this purpose, a cyclone is provided in the area of the oil tank that is aligned substantially vertically in the mounted state of the tank device and is confined by a wall area, and to which the air-oil mixture is supplied in an upper area tangentially to the wall area. Due to centrifugal forces, the air-oil mixture passes through the cyclone in the form of a spiral from the top down. Here, mainly larger oil droplets of the air-oil mixture are separated by the occurring centrifugal forces at the wall area of the cyclone. In the area of a central axis of the cyclone, a volume flow flows upwards, loaded in particular with small oil droplets that have not been separated in the area of the cyclone and also with further oil droplets of different sizes that are absorbed from the spirally moved air-oil volume flow by the rising volume flow in the wall area during the upward movement. The volume flow rising in the area of the central axis of the cyclone is supplied to a conduit area that is confined by a separate wall and that in a mounted state of the tank device extends substantially vertically. As for the flow direction of the volume flow downstream of an inlet opening for the volume flow, the conduit area is coupled to an outlet opening of the tank device that has a pressure limiting valve.

The volume flow discharged from the tank device is supplied to an oil separator or a so-called breather, which may be embodied as a centrifugal oil separator, in order to separate in its area oil droplets from the volume flow that are discharged from the tank device. The separation of larger oil particles from this volume flow is effected via a deflection area that is provided in the area of the breather and that is acting as a centrifuge. Oil particles with smaller diameters are caught by a metal foam that is arranged inside the oil separator and are also filtered from the air in this manner. The oil that is separated in the area of the oil separator is resupplied to the oil circuit. The cleaned air is discharged overboard into the environment.

However, due to their small size, the small oil droplets can be separated only to a limited extent in the area of the centrifugal separator, which is why an undesirably high share of oil is released into the environment through an outlet of the oil separator for the air flow, which is what causes the high oil consumption of presently used engines, among other things. A considerable part of the small oil droplets supplied to the oil separator is supplied to the same through the volume flow from the tank device. For the most part, the small oil droplets in the volume flow that is flowing out of the tank device are created in the area of a pressure limiting valve of the tank device, which is characterized by a dynamic behavior in which opening and closing procedures follow each other in rapid succession. Thus, during operation of the aero engine, large oil droplets are split in the area of the outlet opening into small oil droplets.

It is an objective of the present invention to create a tank device of the kind as it was initially mentioned, in which the number of small oil droplets in a volume flow discharged from the tank device is low.

According to the invention, this objective is solved through a tank device with features as disclosed herein.

The tank device of an aero engine according to the invention has an inlet appliance for the supply of an air-oil volume flow into a tank space of the tank device, a separation appliance for the separation of oil from the air-oil volume flow that is supplied to the tank space, a conduit area that is confined by at least one wall in the area of which an air-oil volume flow can be guided at least in certain areas in the area of the tank space, and an outlet appliance in the area of which a volume flow can be discharged from the tank space of the tank device via a valve appliance.

According to the invention, at least one appliance for introducing oil is provided, by means of which oil can be introduced in the area of the conduit area substantially against a flow direction of the air-oil volume flow that is forming in the conduit area during operation.

In a tank device according to the invention, during a collision of the oil droplets of the air-oil volume flow with the oil introduced via the appliance for introducing oil in the area of the conduit area, the introduced oil and the oil droplets of the air-oil volume flow combine to form larger oil droplets. During operation, these enlarged oil droplets are redirected by substantially 180° by the oil droplets introduced via the appliance with regard to the movement direction of the air-oil volume flow, and preferably depose at a wall area of the tank device due to the effect of centrifugal forces and the influence of gravity. Here, these oil droplets combine with an oil film which forms in the area of this wall area of the tank device during operation. Compared to the volume flows that are released from per se known tank devices, the volume flow supplied to the outlet appliance is characterized by reduced oil loading and a smaller number oil droplets. As a result, a lower number of small oil droplets are formed through the dynamic behavior of the valve appliance.

Through an introduction of oil via the appliance for introducing oil that is directed substantially against the flow direction of the air-oil volume flow, a combination of the air-oil volume flow in the conduit area with its conducted oil droplets and the oil introduced by the appliance is rendered particularly effective, since coalescing between the oil droplets of the air-oil volume flow that is flowing in the conduit area and the oil introduced via the appliance is supported at a high relative velocity. Further, the readiness of the oil droplets of the air-oil mixture to coalesce with the introduced oil into larger oil droplets can be increased if the introduced oil has a considerably lower temperature as compared to the air-oil mixture.

Through the appliance for introducing oil into the air-oil volume flow in the conduit area, a loading with oil of the air flowing out from the tank device is decreased in a simple and effective manner, and in association with this the formation of small oil droplets that can be separated only to a limited extent in the area of an oil separator is reduced, and that without compromising the performance characteristics of the tank device or the valve appliance.

In an advantageous embodiment of the tank device according to the invention, it is provided that the appliance for introducing oil is arranged within the at least one wall of the conduit area. Thanks to such an arrangement of the appliance for introducing oil in a space that is confined by the wall of the conduit area, a large portion of the oil droplets in the air-oil volume flow that is conducted in the conduit area can be impinged with oil via the appliance in a simple manner and combines with the oil to form large oil droplets that can be effectively separated from the air-oil volume flow in the area of the tank device.

Alternatively or additionally, an appliance for introducing oil can also be arranged outside of the conduit area, wherein oil can then be introduced via the appliance for introducing oil in the direction of an outlet opening of the conduit area. In such an arrangement of the appliance, the majority of the oil droplets of the air-oil volume flow that is conducted in the conduit area can also be combined with the oil that is introduced via the appliance. In contrast to the smaller oil droplets, the large oil droplets are characterized by a larger separation affinity in the interior of the tank space. In addition, the separation of the larger oil droplets is also supported by the fact that after coalescing the large oil droplets that are created through the collision of smaller oil droplets flow in the direction of the wall and are separated in the area of the wall before reaching the outlet appliance.

In a constructionally simple embodiment of the tank device, the at least one appliance for introducing oil is arranged at an exterior wall of the tank space.

In a constructionally simple embodiment, the conduit area that is provided for guiding the air-oil volume flow is embodied so as to be at least approximately cylindrical at least in certain sections. However, in principle the conduit area can also have another suitable cross-section.

If, in the mounted state of the tank device, the conduit area extends substantially in the vertical direction so as to guide the air-oil volume flow that forms during operation, a separation effect of the oil droplets that form by coalescing of the oil of the air-oil volume flow and the oil that is introduced via the appliance from the air-oil volume flow is advantageously particularly strong, as here a redirection of the combined oil droplets with respect to the movement direction of the oil droplets of the air-oil volume flow in the direction of wall is particularly effectively supported by gravity.

In an advantageous embodiment of the tank device according to the invention, the oil can be introduced into the air-oil volume flow, in the conduit area or in the area of an outlet opening of the conduit area and substantially against a flow direction of the air-oil volume flow, via the at least one appliance for introducing oil in the form of a spray cone, wherein oil droplets of the introduced oil preferably have a drop size of larger than 50 µm. Via the spray cone that is in particular impinging on the wall of the conduit area and substantially has a main spraying direction that is opposite to a flow direction of the air-oil volume flow, a collision of the oil of the appliance for introducing oil with a great number of oil droplets in the air-oil volume flow is achieved in a simple manner, so that a large number of oil droplets of the air-oil volume flow is combined with the introduced oil to form oil droplets of a desired large size. For this purpose, the appliance for introducing oil can for example be embodied as a mist nozzle so as to preferably create a conical oil spray mist or a diffuse air-oil mist. The oil spray mist consists of drops that have defined diameters by which coalescing with the oil droplets in the air-oil mixture in the area of the bearing chamber is supported. As an alternative to this, the appliance for introducing oil can also be embodied for the introduction of a substantially conical oil film in order to achieve a desired uniform impingement of the air-oil volume flow with oil.

In order to coalesce a particularly large part of oil droplets of the air-oil volume flow that is conducted in the conduit area with the oil that is introduced via the appliance so that they form large oil droplets, it is provided in an advantageous embodiment of the tank device according to the invention that oil can be introduced into the conduit area via the appliance for introducing oil in such a manner that substantially a common cross-sectional area of the conduit area can be impinged with oil. Here, the appliance for introducing oil is preferably arranged in a substantially central manner, i.e. in the area of a central axis of the conduit area, wherein the oil is applied to the conduit area by the appliance preferably at a sharp angle and in a further preferred scenario almost in parallel to the wall of the conduit area.

In an embodiment of the invention that is easy to realize constructionally, the separation appliance is embodied as a cyclone that is confined by a wall area and to which the air-oil volume flow can be supplied in the area of the inlet appliance in a substantially tangential direction. Already in the area of the cyclone it is possible to advantageously separate a large share of oil, in particular of large oil droplets, from the air-oil volume flow that is supplied by the tank device.

When the conduit area, which in a mounted state of the tank device is preferably extending in a substantially vertical direction, is arranged substantially in the area of a central axis of the separation appliance which is confined by a wall area, a volume flow that is rising during operation in the area of the central axis of the separation appliance can be supplied directly to the conduit area in an easy manner.

In a tank device that is embodied in a constructionally simple manner, the conduit area that is arranged in the area of the central axis of the separation appliance directly adjoins the valve appliance and in a mounted state of the tank device extends preferably substantially in the vertical direction.

In order to further improve the oil separation performance in the area of the tank device, a deflection area may be connected to the conduit area, which in a mounted state of the tank device preferably substantially extends vertically, within the conduit area downstream with regard to a flow direction of the air-oil volume flow that is forming during operation. Through the redirection of the air-oil volume flow in the deflection area by for example approximately 90° as compared to the movement direction in the conduit area, further oil droplets of the air-oil volume flow are separated at a wall of the deflection area. In such an embodiment of the tank device, the valve appliance or the outlet appliance is in particular arranged in an off-center position with regard to the conduit area. The air-oil volume flow that is flowing through the conduit area and the deflection area which in the mounted state of the tank device is preferably extending substantially horizontally can advantageously be introduced before discharge from the tank space in the area of the outlet appliance into a so-called expansion chamber of the tank device that is not limited by the walls of the conduit area or the deflection area.

In an advantageous embodiment of the tank device, in which a pressure within the tank device can be adjusted in a simple manner, the valve appliance is embodied as a pressure limiting valve.

In the event that it also becomes necessary to at least partially separate from the volume flow a share of oil that may be contained in the volume flow that is discharged from the tank device before the volume flow is discharged from the aero engine, in an advantageous aero engine an oil separator and/or a cyclone can be arranged downstream of the outlet appliance for the volume flow from the tank device, where the volume flow can be supplied directly or for example via an interior space of an auxiliary unit gear appliance to that oil separator and/or cyclone.

Further advantages and advantageous embodiments of the tank device according to the invention follow from the patent claims and the exemplary embodiments that are principally described in the following by referring to the drawings, wherein, with view to clarity, in the description of the different exemplary embodiments the same reference signs are used for structural components having the same design and functionality.

Herein:

FIG. 1a shows a strongly schematized longitudinal section view of an aero engine, comprising an auxiliary unit gear appliance arranged inside a fan housing;

FIG. 1b shows a rendering of an aero engine that corresponds to FIG. 1A, comprising an auxiliary unit gear appliance that is mounted in the area of the engine core;

Figure 2:
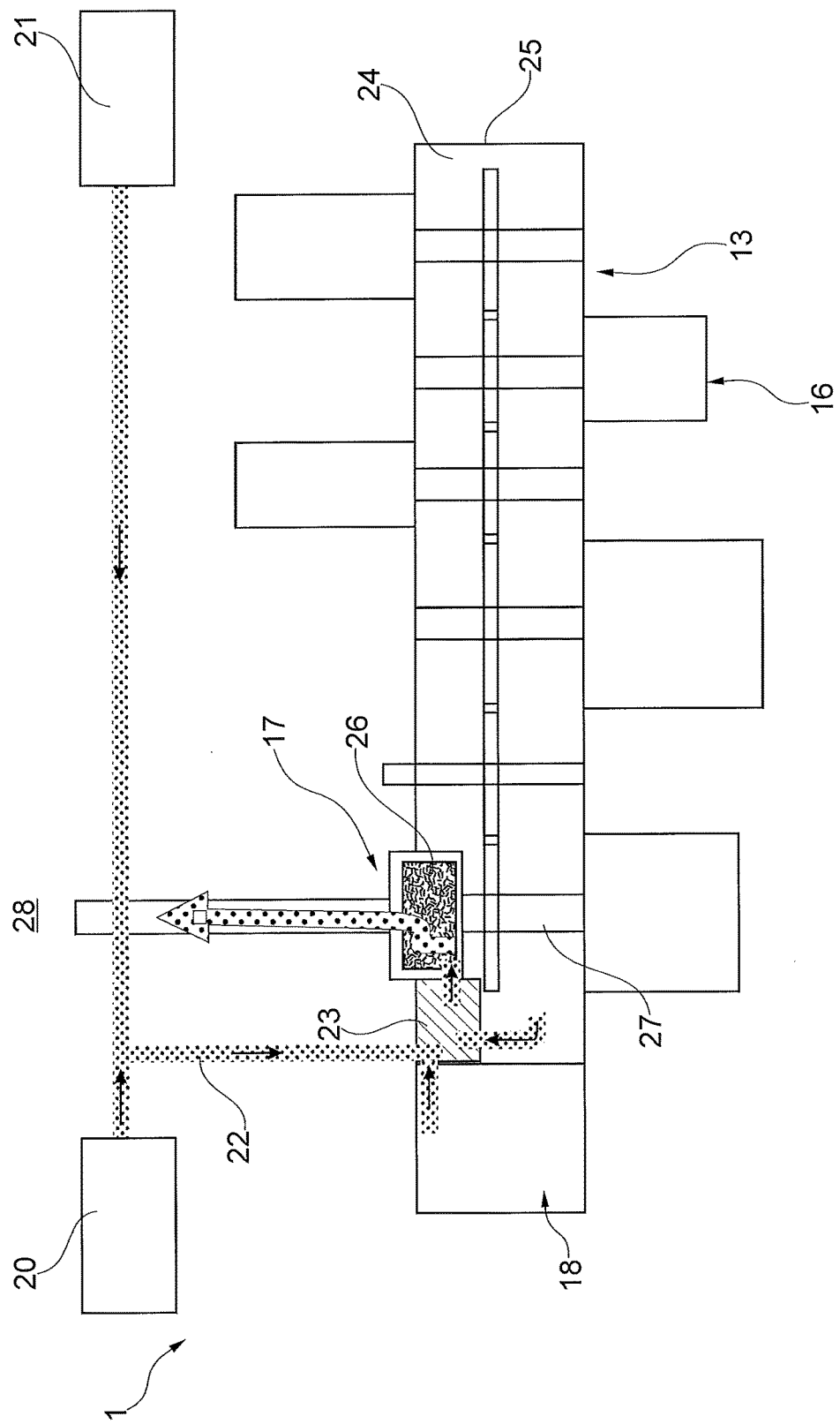
FIG. 2 shows a strongly schematized partial view of the aero engine according to FIG. 1a or FIG. 1B, comprising a tank device arranged in the area of the auxiliary unit gear appliance.

FIG. 1a and FIG. 1b respectively show an aero engine or jet engine 1 in a longitudinal section view. In FIG. 1, an aero engine or jet engine 1 is shown in a longitudinal section view. The aero engine 1 is embodied with a bypass duct 2 and an inlet area 3, wherein a fan 4 connects to the inlet area 3 downstream in a per se known manner. Downstream of the fan 4, the fluid flow in the aero engine 1 is in turn divided into a bypass flow and a core flow, wherein the bypass flow flows through the bypass duct 2 and the core flow flows into an engine core 5, which again is embodied in a per se known manner with a compressor appliance 6, a burner 7 and a turbine appliance 8.

In the present case, the turbine appliance 8 has three rotor devices 9, 10 and 11, which are configured in a substantially comparable design and are connected to an engine shaft 12.

In an embodiment of the aero engine 1 according to FIG. 1A, an auxiliary unit gear appliance 13 is arranged in an exterior engine shroud 14 that confines the bypass duct 2 and represents the exterior circumferential area of the jet engine 1. In the present case, the auxiliary unit gear appliance 13 is connected via a drive shaft 15 that is extending in the radial direction of the jet engine 1 and via an inner gear 16A with the engine shaft 12, and is thus driven or provided with a torque by the engine shaft 12 during operation of the jet engine 1. The auxiliary unit gear appliance 13 supplies different auxiliary units 16 and an oil separator 17, which is also referred to as a breather, with a torque of a desired strength. In addition, in the area of the auxiliary unit gear appliance 13, also a tank device 18 is provided that represents a hydraulic fluid reservoir from which oil for cooling and lubricating various areas of the aero engine 1, such as the bearing appliances 13, the gear wheel pairs of the inner gear 16A and the auxiliary unit gear appliance 13 as well as further assembly groups of the aero engine 1 that need to be cooled and lubricated, is extracted.

In contrast to this, in the embodiment of the aero engine 1 according to FIG. 1B, the auxiliary unit gear appliance 13 comprising the auxiliary units 16 and the oil separator 17 is arranged in the radial direction between the bypass duct 2 and the engine core 5 in a structural component 19 that confines the bypass duct 2 as well as the engine core 5.

FIG. 2 shows an embodiment of the aero engine 1 according to FIG. 1a in strongly schematized form in the area of the auxiliary unit gear appliance 13, the auxiliary units 16 and the oil separator 17, which in the present case is connected to the tank device 18 and two further areas 20, 21 as well as to an interior space 24 of a housing 25 of the auxiliary unit gear appliance 13, which represent all oil-impinged areas of the aero engine 1. In the present case, the areas 20, 21 represent bearing chambers of the aero engine 1 and are impinged during operation of the aero engine 1 by oil from the tank device 18 for the purpose of lubrication and cooling. Here, the area 20 is the bearing chamber of a front bearing and the area 21 is the bearing chamber of a rear bearing of the aero engine 1. As for the aspects that are described in the following with regard to FIG. 2 to FIG. 4, the aero engine 1 according to FIG. 1b has them to a substantially identical degree.

In the embodiment of the aero engine 1 that is shown in FIG. 2, an air-oil volume flow from the front bearing chamber 20 and the rear bearing chamber 21 can respectively be guided in the direction of a conduit area 22, which in the present case leads into a pre-chamber 23 arranged upstream from the oil separator 17. Further, the tank device 18 is also connected to the pre-chamber 23 here, so that a volume flow or air-oil volume flow from the tank device 18 as well as the air-oil volume flows of the bearing chambers 20 and 21 can be tangentially introduced via the conduit area 22 into the pre-chamber 23. As an alternative, it can also be provided that the air-oil volume flow is supplied to the oil separator 17 directly from the tank device 18.

In the shown embodiment, an interior space 24 of a housing 25 of the auxiliary unit gear appliance 13 is also coupled to the pre-chamber 23, wherein if a corresponding pressure is applied to the interior space 24 an air-oil volume flow from the housing 25 of the auxiliary unit gear appliance 13 is also tangentially introduced into the pre-chamber 23. The pre-chamber 23 is connected to the oil separator 17 inside of which a porous area 26 is arranged in a rotatable manner through which the air-oil volume flow that is flowing out of the pre-chamber 23 can pass.

In the present case, the porous area 26 can be driven by the auxiliary unit gear appliance 13 via a gear wheel 27 and acts as a centrifuge so as to reduce the share of oil in the air-oil volume flow that flows through the porous area 26 as far as possible. Here, the oil share of the air-oil volume flow in the oil separator 17 is reduced in the area of the porous area 26 on the one hand like with passing an impact filter, and on the other hand like when separating the oil from the air in the area of a centrifuge through the rotation of the porous area 26. The oil that is filtered out of the air-oil volume flow in the area of the porous area 26 is suctioned off in the exterior area of the oil separator 17 in a manner that is not shown in any more detail by means of a pumping appliance, and is guided back into the tank device 18. The air flow that is flowing from the oil separator 17 in the direction of the environment 28 has a very low oil load, so that during operation of the aero engine 1 no trail of smoke that is visible from outside is created.

In the area of the oil separator 17, oil droplets with a very small diameter of about 1 μm can only be separated to a limited extent. However, the volume flow that is respectively discharged from known tank devices can contain a large share of such smaller oil droplets.

Figure 3:
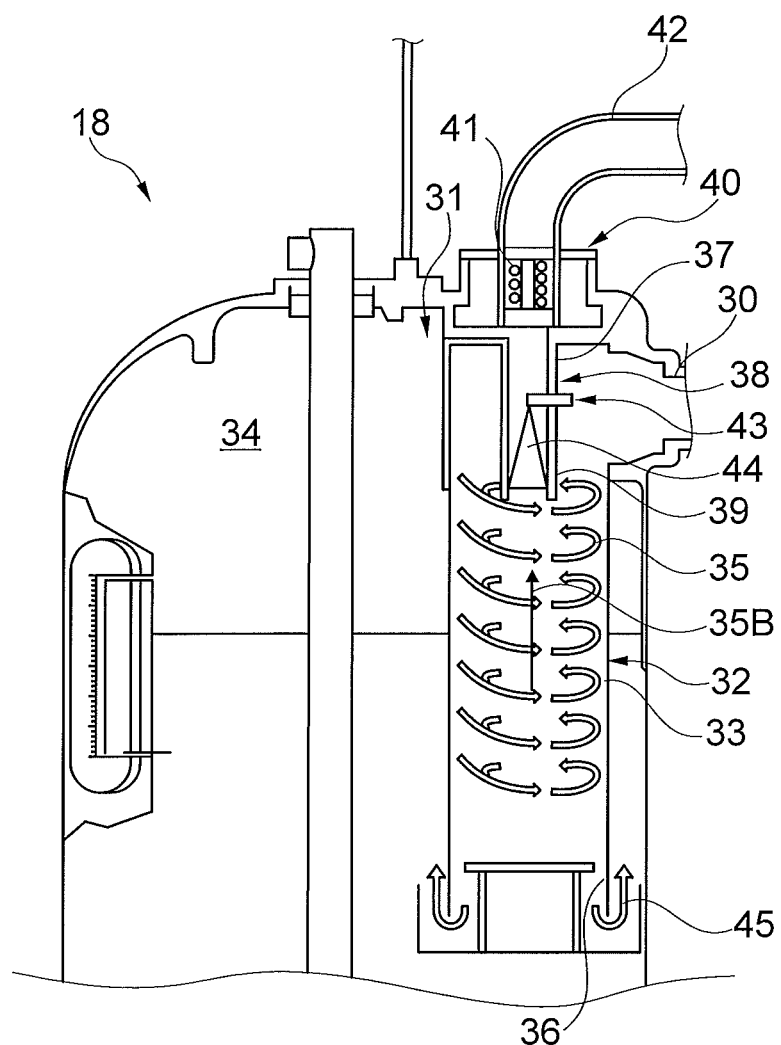
FIG. 3 shows a simplified sectional view of the tank device of FIG. 2 in isolation.

A preferred exemplary embodiment of the tank device 18 according to the invention is shown in FIG. 3, in which a share of smaller oil droplets of the volume flow that is discharged from the tank device 18 is reduced as compared to known embodiments. The tank device 18 according to FIG. 3 has an inlet appliance 30, via which the tank device 18 can be supplied with an air-oil volume flow from an area of the aero engine 1 that is impinged by oil. The air-oil volume flow is supplied within a tank space 31 of the tank device 18, inside of which a pressure of approximately 1 bar is usually present, to a separation appliance 32 that is embodied as a cyclone here. In the present case, the cyclone 32 has a substantially cylindrical wall area 33, through which the cyclone 32 is separated from an expansion chamber 34 of the tank device 18 at least in certain areas. The air-oil volume flow is introduced into the cyclone 32 at an off-center position and tangentially to the wall area 33 in an upper area of the cyclone 32, as it is positioned in the mounted state of the tank device 18. Starting from the inlet appliance 30, the air-oil volume flow flows downwards in the area of the cyclone 32 in a spiral manner as indicated by the arrows 35 and along the wall area 33 of the cyclone. Due to the present effects of centrifugal forces, in particular big and heavy oil droplets of the air-oil volume flow are separated at the wall area 33 of the cyclone 32 and form an oil film there. Due to gravity, the oil film flows downwards along the wall area 33 and is drained through an outlet opening 36 of the cyclone 32 in the direction indicated by arrows 45 into an oil reservoir of the tank device 18.

Through the dynamic conditions present in the area of the cyclone 32, an air-oil volume flow rises within the cyclone 32 in the area of a central axis of the cyclone 32 in the direction indicated by arrows 35B. In particular in the area of the cyclone 32, non-separated small oil droplets as well as oil droplets of various sizes that are transitioning from the air-oil volume flow that is flowing downwards in the cyclone 32 in a spiral manner are carried along in this air-oil volume flow. In the present case, the air-oil volume flow rising in the cyclone 32 in the direction indicated by the arrows 35B is supplied within an upper area that is located approximately at the same height as the inlet appliance 30 to a conduit area 38 that is confined by a wall 37, is embodied in a cylindrical manner in the present case and has a central axis in the present case that is arranged substantially so as to coincide with the central axis of the cyclone 32, thus extending substantially in the vertical direction in the installation position of the tank device 18. On a side of the conduit area 38 that is facing away from the inlet opening 39 of the conduit area 38, the latter adjoins, in the area of an outlet appliance 40 of the tank device 18, to a valve appliance that in the present case is embodied as spring-pretensioned pressure limiting valve 41 or a pressure reducing valve via which the engine oil system of an aircraft embodied with the tank device 18 can be supplied with pressure even at high flight altitudes of the aircraft. Downstream of the pressure limiting valve 41, a volume flow is supplied to a conduit 42 which in the present case is connected to a pre-chamber 23.

As for a flow direction of the air-oil volume flow that forms during operation of the aero engine 1 within the conduit area 38, what is provided in the present case downstream of the inlet opening 39 of the conduit area 38 within the wall 37 of the conduit area 38 is an appliance 43 for introducing oil that is connected to the wall 37 and via which oil can be introduced into the air-oil volume flow that is flowing through the inlet opening 39.

With the appliance 43 for introducing oil, oil can be introduced into the conduit area 38 via an outlet opening of the appliance 43 that is not shown in any more detail and that is arranged in an area that is central with respect to the central axis of the conduit area 38, which in the present case is done in the form of a spray cone 44 that is schematically shown in FIG. 3, or in the form of a conical oil film. In order to be able to form a spray cone 44 that is as well-directed as possible, the oil is introduced into the conduit area 38 via the appliance 43 for introducing oil with a pressure of for example 3 bar to 12 bar, in particular 4 bar to 9 bar. Here, an area impinged by oil through the oil spray cone 44 of the appliance 43 in the longitudinal direction of the conduit area 38 becomes bigger the higher the pressure difference between the supply pressure of the oil that is introduced via the appliance 38 and the pressure inside the tank space 31 is. In addition, the oil spray cone 44 is formed so as to be very stable even when a big pressure difference is present and when, like in the present case, turbulences occur in the air-oil volume.

Via the appliance 38 for introducing oil, the spray cone 44 can be preferably formed in such a manner that oil can be guided at a preferably sharp angle to the wall 37 of the conduit area 38, wherein in particular an entire cross-sectional area of the conduit area 38 is covered by the spray cone 44. Accordingly, the entire air-oil volume flow that is flowing through the conduit area 38 through the inlet opening 39 is impinged by the spray cone 44 with oil. In this manner it is achieved that a large part of the oil droplets of the air-oil volume flow, preferably all oil droplets of the air-oil volume flow, unite or coalesce with the oil of the appliance 43 for introducing oil so as to form larger oil droplets. As the oil droplets unite, the oil droplets of the air-oil volume flow are redirected here by approximately 180°, with the large oil droplets—supported by the effect of centrifugal and gravitational forces—preferably being discharged downward, in a direction away from the outlet appliance 40, and flowing in a direction opposite to the air-oil volume flow and being separated from the same.

As an alternative to this, the appliance for introducing oil can also be embodied in such a manner that an entire cross-sectional area of the wall area of the cyclone can be impinged with oil by means of the appliance, wherein such an appliance has the same principles of operation as the appliance 38 that has been described in more detail above.

In the present case, coalescing of the oil droplets of the air-oil volume flow and the introduced oil is supported respectively by gravitational forces between the individual oil droplets, wherein the tendency of the oil droplets to merge into larger oil droplets grows as the ratio of the diameters of the oil droplets increases. The tendency of the oil droplets of the oil that is introduced or sprayed-in via the appliance 43 to coalesce with the oil droplets in the area of the conduit area 38 can additionally be increased if the introduced oil has a considerably reduced temperature as compared to the air-oil volume flow supplied to the conduit area 38. In addition, the merging of the oil droplets of the air-oil volume flow in the conduit area 38 with the oil introduced into the conduit area 38 through the appliance 43 is enhanced as the relative velocity between the air-oil volume flow in the conduit area 38 and the oil introduced by the appliance 43 becomes higher.

The large oil droplets, forming as the oil from the air-oil volume flow and the oil introduced via the appliance 43 merge, show the tendency to separate at an oil film that forms during operation of the aero engine 1 at least in certain areas at the wall 37 of the conduit area 38, wherein oil of the oil film is conveyed through gravity in the direction of the outlet opening 36 of the cyclone 32 and from there is supplied to a hydraulic reservoir of the tank device 18.

The volume flow that is supplied to the pressure limiting valve 41 downstream of the appliance 43 in the conduit area 38 advantageously has a very low or no oil load, so that, thanks to the dynamic behavior in the area of the pressure limiting valve 41, where opening and closing procedures follow in rapid succession during operation of the aero engine 1, no or only a very small number of small oil droplets are formed from the large oil droplets of the volume flow. Thus, the volume flow that is supplied to the pre-chamber 23 downstream of the outlet appliance 40 of the tank device 18 via the conduit 42 has a strongly reduced oil loading with a low share in smaller oil droplets as compared to known embodiments of the tank device.

Figure 4:
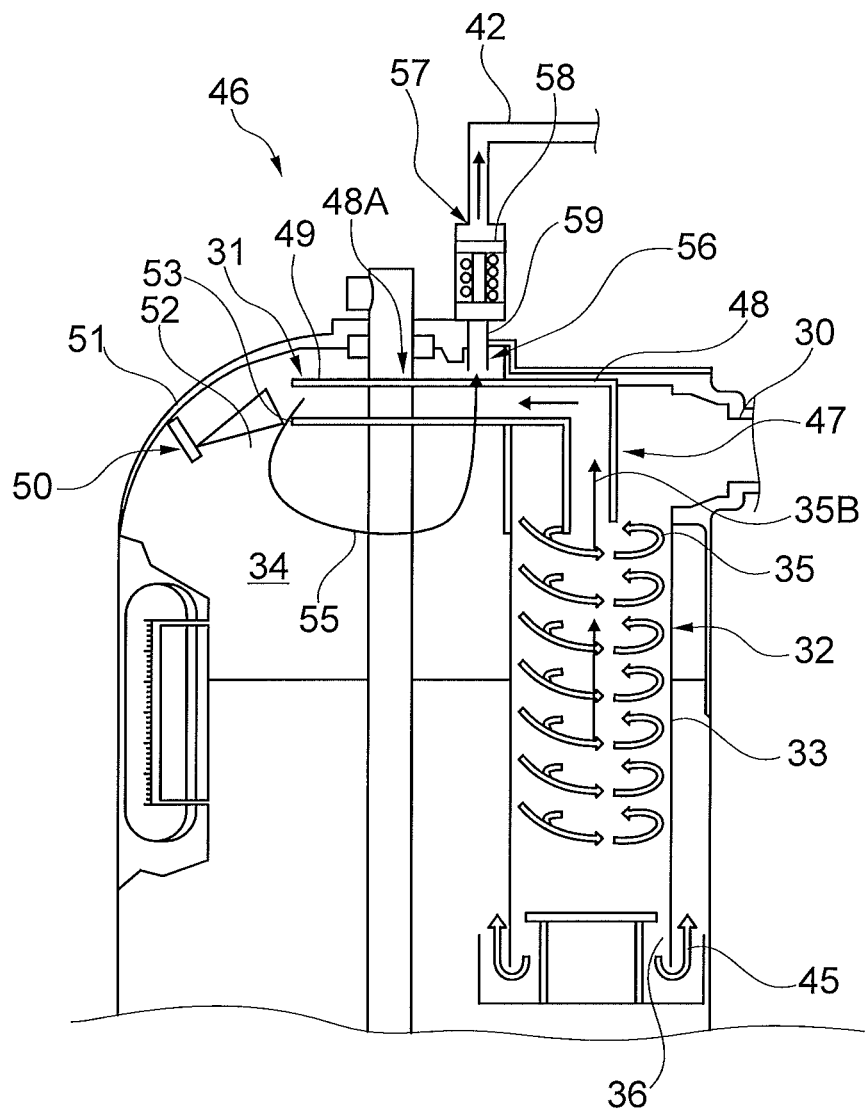
FIG. 4 shows a simplified sectional view of an alternative embodiment of a tank device in isolation.

FIG. 4 shows a tank device 46 that is embodied in an alternative manner to the tank device 18 that is embodied according to FIG. 3. Since the basic design of tank device 46 is comparable to the one of tank device 18, in the following only the differences to the tank device 18 are discussed and reference is made to the above description of FIG. 3 with regard to the further functionality of the tank device 46.

In contrast to the conduit area 38 of the tank device 18, the rising air-oil volume flow in the cyclone 32 is not directly supplied to the valve appliance 41 via a conduit area 47 of the tank device 46. The conduit area 47 is connected to a deflection area 48 as well as a conduit area 48A arranged downstream of the same and extends substantially horizontally in the mounted state of the tank device 46, ending in the expansion chamber 34 of the tank device 46. Through the redirection of the air-oil volume flow that is supplied to the conduit area 47 in the deflection area 48, an additional separation of particularly large oil droplets from the air-oil volume flow is achieved. These oil droplets are also separated by gravity at the wall 49 of the deflection area 48 or of the conduit area 48A and form an oil film there, which in turn is drained into the hydraulic fluid reservoir of the tank device 46.

The tank device 46 has an appliance 50 for introducing oil, which in the embodiment according to FIG. 4 in the present case is arranged at an exterior wall 51 of the tank device 46, and thus outside of a space that is confined by the conduit areas 47, 48A and the deflection area 48. The appliance 50 for introducing oil is substantially embodied in a manner comparable to the appliance 43 for introducing oil. A spray cone 52 of the appliance 50 for introducing oil is directed in the direction of an outlet opening 53 of the conduit area 48A in such a way that the entire air-oil volume flow that is flowing through the outlet opening 53 of the conduit area 48A can be impinged with oil by the appliance 50 for introducing oil. The large oil droplets that are formed through the coalescing of the oil that is introduced via the appliance 50 and the oil droplets of the air-oil volume flow are redirected by approximately 180° through the oil introduced via the appliance 50, and in this manner pressed to a desired extent against the wall 49 of the deflection area 48 or of the conduit area 48A, wherein, as they impinge on the wall 49, the large oil droplets separate in an oil film that is formed during operation of the aero engine 1 at the wall 49 of the deflection area 48 or of the conduit area 48A. The air-oil volume flow that is introduced into the expansion chamber 34 through the outlet opening 53 of the conduit area 48A flows, as indicated by way of example by arrow 55, through the expansion chamber 34 in the direction of a further conduit area 56. As has been described in more detail with respect to tank device 18, the volume flow supplied to the further conduit area 56 is guided in the area of an outlet appliance 57 of the tank device 46 via the valve appliance that is embodied as a pressure limiting valve 58 in the direction of pre-chamber 23.

Just as in the tank device 18, in the tank device 46 according to FIG. 3 oil is separated to such an extent from the air-oil volume flow by means of the appliance 50 for introducing oil, that the volume flow that is discharged from the tank device 46 through the outlet appliance 57 contains a very small amount of oil, or in the optimal case exits the tank device as an oil-free air stream.

In the tank device 46, another appliance for introducing oil that is not shown in any more detail can be arranged within a wall 59 that is confined by a further conduit area 56 additionally to or instead of appliance 50 for introducing oil, wherein, when it comes to its mode of operation, reference is again made to the embodiments of the appliance 43 for introducing oil into the conduit area 38.

PARTS LIST 1 aero engine, jet engine
2 bypass duct
3 inlet area
4 fan
5 engine core
6 compressor appliance
7 burner
8 turbine appliance
9, 10, 11 rotor device
12 engine shaft
13 auxiliary unit gear appliance
14 engine shroud
15 drive shaft
16 auxiliary units
16A inner gear
17 oil separator
18 tank device
20 area, front bearing chamber
21 area, rear bearing chamber
22 conduit area
23 pre-chamber
24 interior space of the auxiliary unit gear appliance
25 housing of the auxiliary unit gear appliance
26 porous area of the oil separator
27 gear wheel
28 environment
30 inlet appliance
31 tank space of the tank device
32 separation appliance, cyclone
33 wall area of the separation appliance
34 expansion chamber of the tank device
35, 35B arrow
36 outlet opening of the cyclone
37 wall of the conduit area
38 conduit area
39 inlet opening of the conduit area
40 outlet appliance of the tank device
41 valve appliance, pressure limiting valve
42 conduit
43 appliance for introducing oil
44 spray cone
45 arrows
46 tank device
47 conduit area
48 deflection area
48A conduit area
49 wall of the deflection area or of the conduit area
50 appliance for introducing oil
51 exterior wall of the tank device
52 spray cone
53 outlet opening of the conduit area
55 arrow 56 further conduit area
57 outlet appliance of the tank device
58 valve appliance, pressure limiting valve
59 wall of the further conduit area

The invention claimed is:
1. A tank device of an aero engine, comprising:
an inlet for supplying an air-oil volume flow into a tank space of the tank device,
an oil separator for receiving the air-oil volume flow supplied into the tank space and separating oil from the air-oil volume flow to form a reduced oil air-oil volume flow,
a conduit positioned in the tank space and confined by a wall for receiving and guiding the reduced oil air-oil volume flow from the oil separator,
an oil injector for injecting oil into the reduced oil air-oil volume flow guided through the conduit to form a further reduced oil air-oil volume flow, the oil injector arranged to inject the oil into the reduced oil air-oil volume in an injection direction substantially against a flow direction of the reduced oil air-oil volume flow guided through the conduit,
an outlet through which the further reduced oil air-oil volume flow can be discharged from the tank space, the outlet including a valve for controlling the further reduced oil air-oil volume flow through the outlet.

2. The tank device according to claim 1, wherein the oil injector is arranged within the wall of the conduit.

3. The tank device according to claim 1, wherein the oil injector is arranged outside of the wall of the conduit and oil can be introduced via the oil injector in a direction of an outlet opening of the conduit.

4. The tank device according to claim 3, wherein the tank space includes an exterior wall and the oil injector is arranged at an exterior wall of the tank space.

5. The tank device according to claim 4, wherein the conduit is cylindrical at least in certain portions.

6. The tank device according to claim 5, wherein, in a mounted state of the tank device, the conduit includes a portion extending substantially in a vertical direction for guiding the reduced oil air-oil volume flow.

7. The tank device according to claim 6, wherein the oil injector includes a nozzle for injecting the oil in a form of a spray cone.

8. The tank device according to claim 7, wherein the oil injector provides a spray area for the oil that substantially covers an entire cross-sectional area of the conduit.

9. The tank device according to claim 8, wherein the oil separator includes a cyclone confined by a wall area and that can be supplied with the air-oil volume flow from the inlet in a substantially tangential direction.

10. The tank device according to claim 9, wherein the conduit is substantially arranged in an area of a central axis of the oil separator.

11. The tank device according to claim 10, wherein the conduit directly adjoins the valve.

12. The tank device according to claim 10, and further comprising a deflection area connecting to the conduit downstream with respect to the flow direction of the reduced oil air-oil volume flow within the conduit.

13. The tank device according to claim 1, wherein the valve is a pressure limiting valve.

14. The tank device according to claim 1, wherein the conduit is cylindrical at least in certain portions.

15. The tank device according to claim 1, wherein, in a mounted state of the tank device, the conduit includes a portion extending substantially in a vertical direction for guiding the reduced oil air-oil volume flow.

16. The tank device according to claim 1, wherein the oil injector includes a nozzle for injecting the oil in a form of a spray cone.

17. The tank device according to claim 1, wherein the oil injector provides a spray area for the oil that substantially covers an entire cross-sectional area of the conduit.

18. The tank device according to claim 1, wherein the oil separator includes a cyclone confined by a wall area and that can be supplied with the air-oil volume flow from the inlet in a substantially tangential direction.

19. The tank device according to claim 1, wherein the conduit is substantially arranged in an area of a central axis of the oil separator.

20. The tank device according to claim 1, and further comprising a deflection area connecting to the conduit downstream with respect to the flow direction of the reduced oil air-oil volume flow within the conduit.

* * * * *